(12) United States Patent
Spurway et al.

(10) Patent No.: US 6,308,914 B1
(45) Date of Patent: Oct. 30, 2001

(54) APPARATUS FOR THE SUPPRESSION OF INFRA RED EMISSIONS FROM AN ENGINE

(75) Inventors: Simon Peter Spurway, Stoke Sub Hamdon; Anastasios Kokkalis, Yeovil, both of (GB)

(73) Assignee: GKN Westland Helicopters Limited (GB)

( * ) Notice: Subject to any disclaimer, the term of this patent is extended or adjusted under 35 U.S.C. 154(b) by 0 days.

(21) Appl. No.: 09/518,826

(22) Filed: Mar. 6, 2000

(30) Foreign Application Priority Data

Mar. 11, 1999 (GB) .................................................... 9906258

(51) Int. Cl.[7] .................................................. B64D 33/04
(52) U.S. Cl. ..................................... 244/53 R; 239/127.1; 60/39.5
(58) Field of Search .................................. 244/1 R, 53 R, 244/121; 60/264, 39.5, 261, 267, 271, 39.31, 39.32; 239/265.17, 265.19, 127.1, 127.3, 265.39, 265.32

(56) References Cited

U.S. PATENT DOCUMENTS

| | | | |
|---|---|---|---|
| 4,026,472 | * | 5/1977 | Rabone ............................ 239/127.3 |
| 4,290,262 | * | 9/1981 | Wynosky et al. ...................... 60/262 |
| 5,044,464 | | 9/1991 | Bremigan . |
| 5,088,575 | | 2/1992 | Eriksson . |
| 5,775,589 | * | 7/1998 | Vdoviak et al. ................... 239/127.1 |
| 5,799,874 | * | 9/1998 | Eigenbrode et al. .............. 239/127.1 |
| 6,112,513 | * | 9/2000 | Catt et al. ......................... 239/265.17 |

FOREIGN PATENT DOCUMENTS 1456018   11/1976  (GB) .

* cited by examiner

*Primary Examiner*—Galen L. Barefoot
(74) *Attorney, Agent, or Firm*—Larson & Taylor, PLC

(57) ABSTRACT

An apparatus for the suppression of infra red emissions from an engine includes a suppressor body through which pass exhaust gases from the engine, the suppressor body having an inlet means for air which is mixed within the suppressor body with the hot exhaust gases to cool the exhaust gases before final exhaustion, characterised in that at least one sonic or supersonic energy generator is provided to apply within the suppressor body, sonic or supersonic energy to enhance the efficiency of infra red suppression.

11 Claims, 4 Drawing Sheets

APPARATUS FOR THE SUPPRESSION OF INFRA RED EMISSIONS FROM AN ENGINE

BACKGROUND TO THE INVENTION

This invention relates to an apparatus for the suppression of infra red emissions from a jet engine, and more particularly but not exclusively to such an apparatus for the suppression of infra red emissions from a gas turbine engine of an aircraft such as a helicopter.

Helicopter gas turbine engines generate significant amounts of waste thermal energy. Upon exit from the exhaust pipe of the engine, infra red emissions in this waste energy are readily observable by thermal imaging means as an exhaust plume and thus may be used in the targeting of the aircraft by enemy weapon systems. Also hot exhaust plumes can interact with the fuselage, thus heating the fuselage and causing the fuselage to radiate infra red energy.

DESCRIPTION OF THE PRIOR ART

It is known to suppress the infra red emissions in the exhaust and to cool the exhaust by mixing the hot exhaust gases with a substantial volume of ambient temperature air within a suppressor body located such that the exhaust gases from the exhaust of the engine pass into the suppressor body. Thus substantially cooled exhaust gases are ejected from the helicopter. The greater the cooling efficiency of the suppressor system, the greater the survival probability of the helicopter.

Known suppressor systems are however inefficient at mixing the hot exhaust gases and the cooling air whilst maintaining the suppressor body of an acceptably light and small construction, resulting in only a low reduction of the overall temperature of the exhaust plume. Larger heavier structures which are more efficient at exhaust gas temperature reduction produce large associated engine installation losses and can affect helicopter performance.

Various proposals have been put forward for improving the efficiency of infra red suppression systems, such as described in GB-A-2100798, or EP-A0286800. Such prior proposals have however concentrated solely on the configuration of the suppressor body to improve reduction of engine exhaust gas temperatures.

SUMMARY OF THE INVENTION

According to a first aspect of the invention we provide an apparatus for the suppression of infra red emissions from an engine including a suppressor body through which pass exhaust gases from the engine, the suppressor body having an inlet means for air which is mixed within the suppressor body with the hot exhaust gases to cool the exhaust gases before final exhaustion, characterised in that means are provided to apply within the suppressor body, sonic or supersonic energy to enhance the efficiency of infra red suppression.

Thus in an apparatus in accordance with the invention although the design and configuration of the suppressor body is obviously important improvements in the efficiency of infra red suppression may be achieved in a novel and inventive manner as the flow direction and properties of, particularly but not exclusively, a gas turbine engine exhaust, may be altered by the application of sonic or supersonic energy.

In a typical arrangement, and preferably in an apparatus in accordance with the invention the suppressor body at least substantially surrounds the engine exhaust pipe, and provides a duct between the engine exhaust pipe and suppressor body which duct provides the air inlet means. Thus the ambient temperature air is drawn into the suppressor body for mixing with the hot exhaust gases from the exhaust pipe of the engine.

In such an arrangement, the exhaust plume which is ejected from the suppressor body is of generally conical configuration. To enhance mixing of the hot engine exhaust gases and the ambient air, the cone angle generated within the suppressor body needs to be as wide as possible and widening of the cone may be achieved by the application of sonic or supersonic energy. Thus in one embodiment, the sonic or supersonic energy may be applied by actuator means provided on the engine exhaust pipe within the suppressor body. The precise frequency or frequencies of vibration may be determined theoretically, or by experiment such as by placing a probe within the suppressor body and applying different frequencies to achieve optimum cone widening. The edge of the core flow is characterised by the presence of a strong shear layer which divides the hot exhaust gases from the surrounding cool air flow. The presence of the shear layer acts to reduce the rate of mixing between the hot exhaust gases and the surrounding cool air. The application of sonic or supersonic energy serves to disrupt or weaken the shear layer and significantly enhance the rate of mixing between the hot exhaust gases and the surrounding cold air.

In another embodiment sonic or supersonic energy is applied to promote attachment of a boundary layer flow at an internal surface of the suppressor body. This is desirable both to reduce engine installation losses as a result of separation of flow at the surface due to boundary layer flow being slowed at the surface and thus tending to separate away from the surface, and to maintain efficient cooling of the surface itself to enhance infra red suppression. Thus the sonic energy may be applied by actuator means provided on the surface of the suppressor body, for example on an external surface of the suppressor body.

It has been found that this improves airflow, over the internal surface hence heating of the surface, is minimised or prevented altogether. This is important since it prevents the suppressor body itself from becoming warm and thereby becoming a source of radiant energy which could be detected.

In each case, the actuator means may include a plurality of high frequency response actuators, such as piezo-ceramic actuators, which may be controlled by a control means which applies a signal of a desired frequency to the actuators.

Although the invention may be applied to engines generally, preferably the apparatus is adapted for use with a gas turbine engine or the like.

According to a second aspect of the invention we provide an engine and an apparatus for the suppression of infra red emissions from the engine characterised in that the apparatus for the suppression of infra red emissions is an apparatus according to the first aspect of the invention.

According to a third aspect of the invention we provide a vehicle having an engine and an apparatus for the suppression of infra red emissions from the engine according to the second aspect of the invention.

The vehicle may be an aircraft e.g. a helicopter.

According to a fourth aspect of the invention we provide a method of enhancing the efficiency of the suppression of infra red emissions from an engine including the steps of providing a suppressor body for the passage of exhaust gases from the engine, the suppressor body having an inlet means for air which is mixed within the suppressor body with the hot exhaust gases to cool the exhaust gases before final exhaustion, characterised in that the method includes applying within the suppressor body, sonic or supersonic energy.

BRIEF DESCRIPTION OF THE DRAWINGS

The invention will now be described with reference to the accompanying drawings in which.

DESCRIPTION OF THE PRIOR ART

Figure 1:
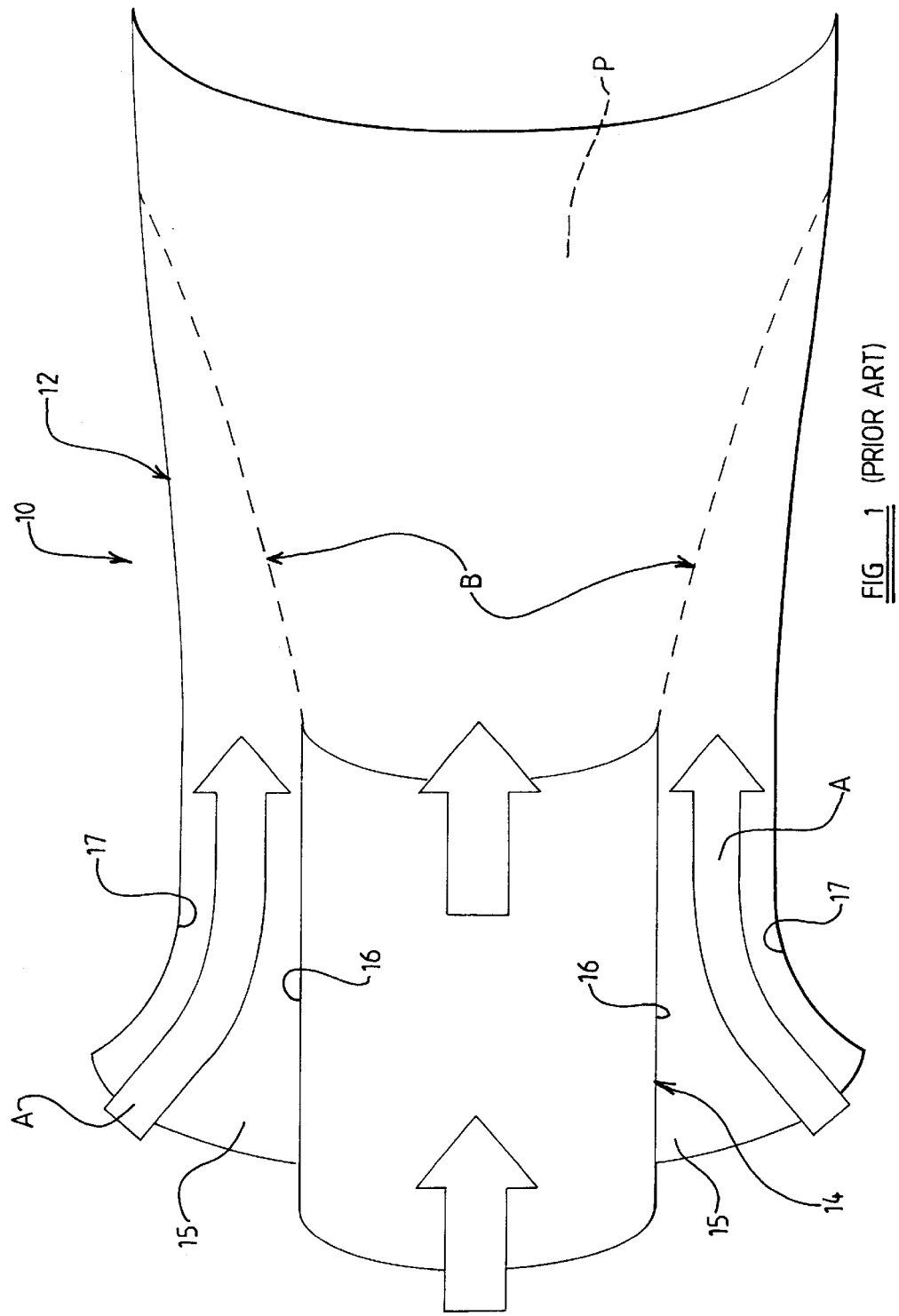
FIG. 1 is a diagrammatic illustration of a typical prior art infra red suppressor apparatus to which the invention may be applied.

Referring to FIG. 1, a typical apparatus 10 for suppressing the infra red emissions from a gas turbine engine of an aircraft, includes a suppressor body 12 which surrounds or at least substantially surrounds an exhaust pipe 14 of the engine, and provides a duct 15 between the external surface 16 of the exhaust pipe 14 and an internal surface 17 of the suppressor body 12, through which relatively cool ambient air is drawn, as indicated by arrows A by a pumping effect of the engine exhaust.

The ambient air mixes with and cools the hot exhaust gases, and the cooled exhaust gas/air mixture is ejected from the suppressor body 12 as an exhaust plume P. A cone angle B formed by the engine exhaust gases upon entry into the suppressor body at the interface between the hot gases and the cooling airflow is desirably as wide as possible in order to increase the efficiency of the mixing of the hot exhaust gases and colder air within the suppressor body 12.

DESCRIPTION OF THE PREFERRED EMBODIMENTS

Figure 2:
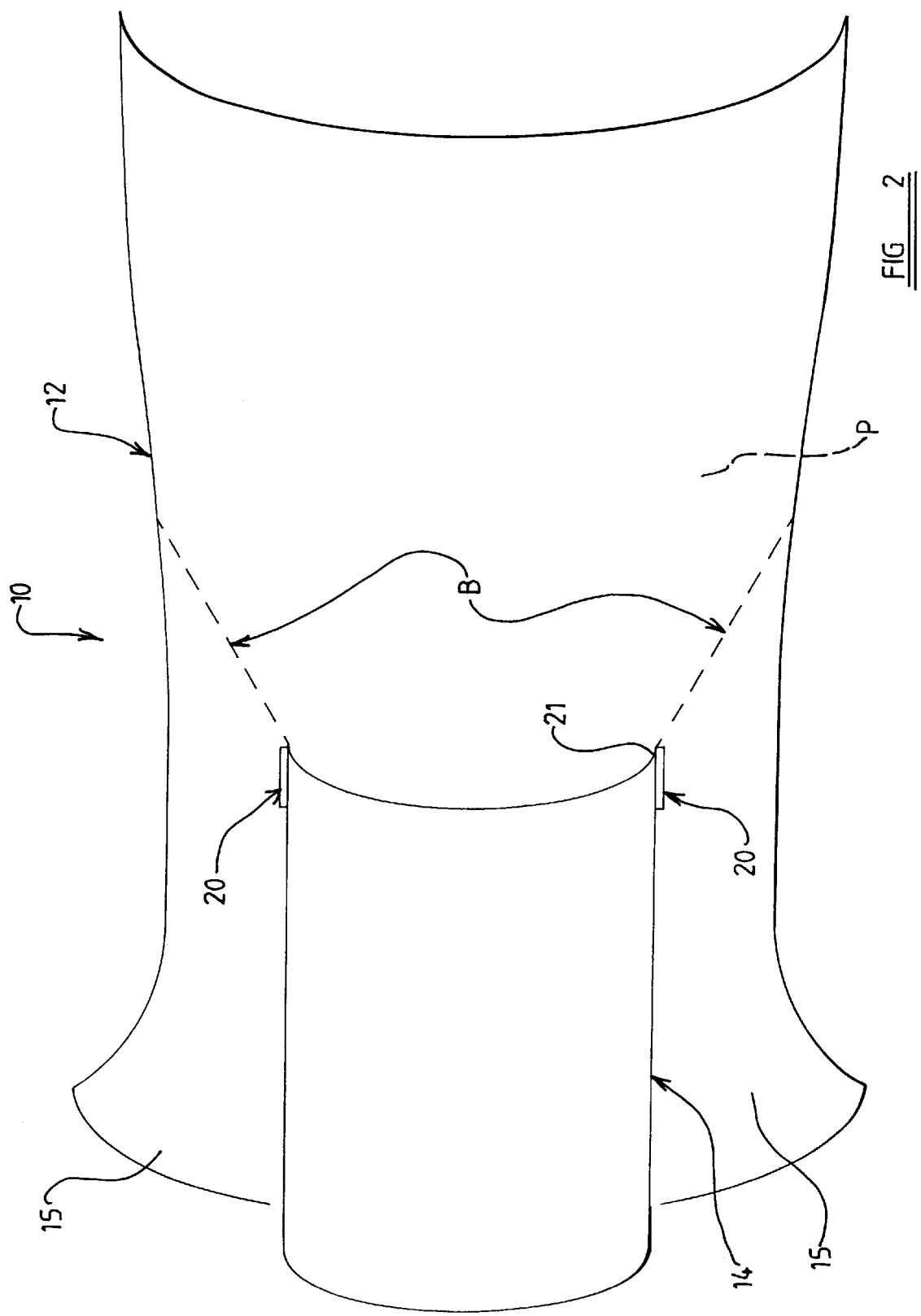
FIG. 2 is a view similar to that of FIG. 1 but of a first embodiment of the invention.

Referring now to FIG. 2, similar parts to those of FIG. 1 are labelled with the same reference numerals.

To promote mixing of the hot exhaust gases and colder air within the suppressor body 12, sonic or supersonic energy is applied inside the suppressor body 12 by means of actuator means in the form of a plurality of piezo-ceramic actuators 20 around the end 21 of the exhaust pipe 14. These actuators 20 are provided with high frequency alternating current from an external control means, and as a result, produce vibrations in the flowing gases/ambient air.

It has been found that such sonic or supersonic energy serves to widen the cone angle B of the ejected exhaust plume P by increasing the rate of spread of the free shear layers formed between the hot gases and the cooling air flow resulting in a cooler exhaust plume.

The precise frequency or frequencies to achieve optimum improvement in mixing efficiency, may be determined theoretically or by experiment.

Figure 3:
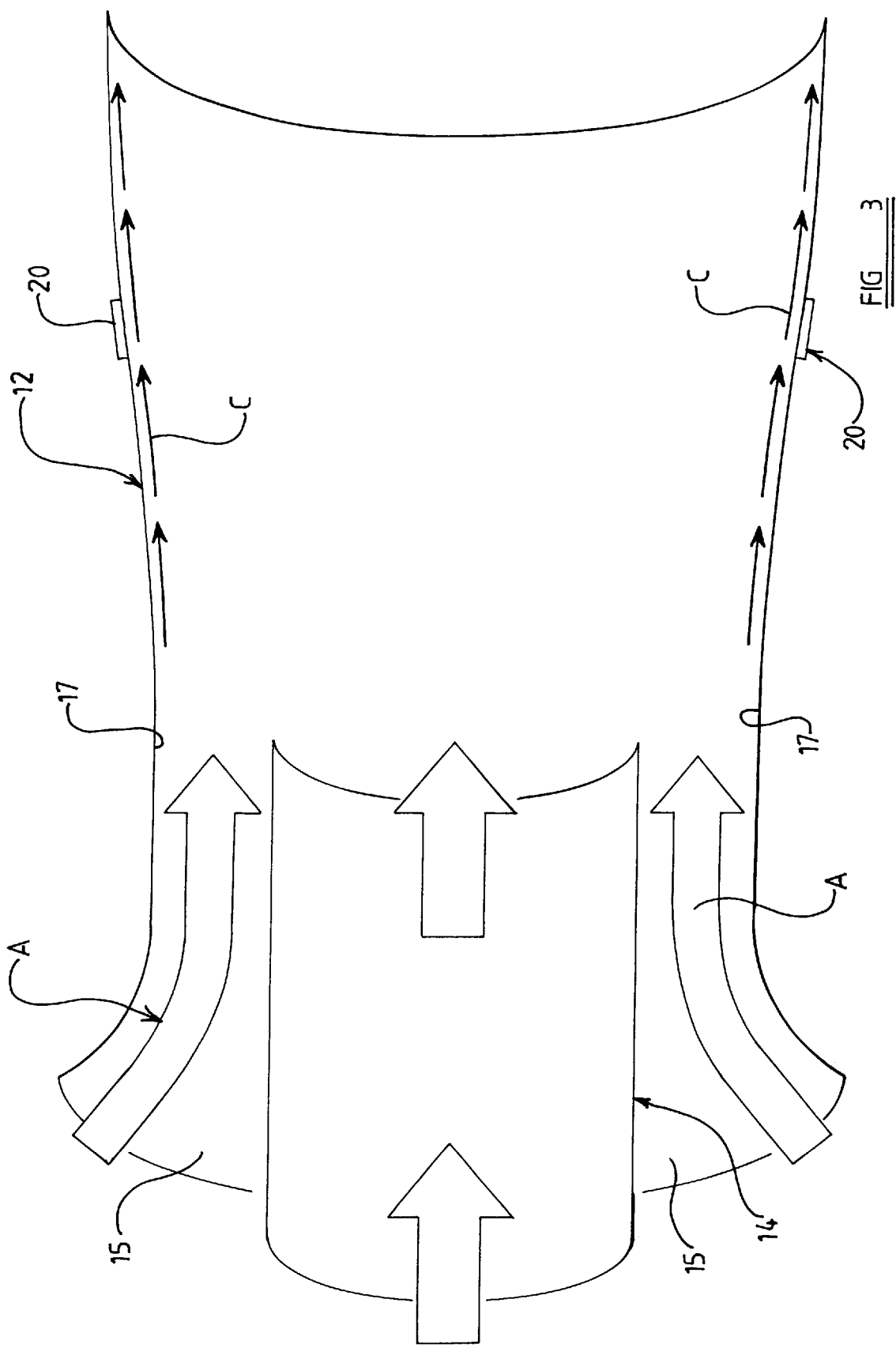
FIG. 3 is a view similar to FIGS. 1 and 2 but of a second aspect of the invention.

Referring now to FIG. 3, a second embodiment of the invention is shown. It will be appreciated that at the internal surface 17 of the suppressor body 12 along which the cooling air and/or air/exhaust gas mixture flows, the flowing air/gas will be slowed by the boundary layer C being in contact with the internal surface 17. This can affect boundary layer flow detrimentally, and the boundary layer C may even separate away from the internal surface 17 thereby introducing engine installation losses, and resulting in at least hot spots over the surface 17 which may be observable by thermal imaging means.

In accordance with a second embodiment of the invention, piezo-ceramic actuators 20 are provided to apply sonic or supersonic energy to the surface 17 of the suppressor body 12. It has been found that this re-energises the boundary layer C thereby promoting air flow attachment and thus reducing flow losses, and ensuring a more constant air flow over the surface 17 to more efficiently cool the surface 17 and help avoid hot spots.

In the example of FIG. 3, the actuators 20 are provided exteriorly of the surface 17 of the suppressor body 12 and are vibrated by an alternating electrical current signal provided by a control means. The actuators 20, whilst being on the exterior of the surface 17 induce vibration of the surface and in yet another arrangement, may be provided in or interiorly of the surface 17. Again the optimum frequency or frequencies of vibration of the actuators 20 may be found theoretically and/or by experiment, as may the preferential positioning of and number of the actuators 20. Obviously the magnitude of the sonic or supersonic energy applied must in all cases be sufficient to have desirable effect.

Figure 4:
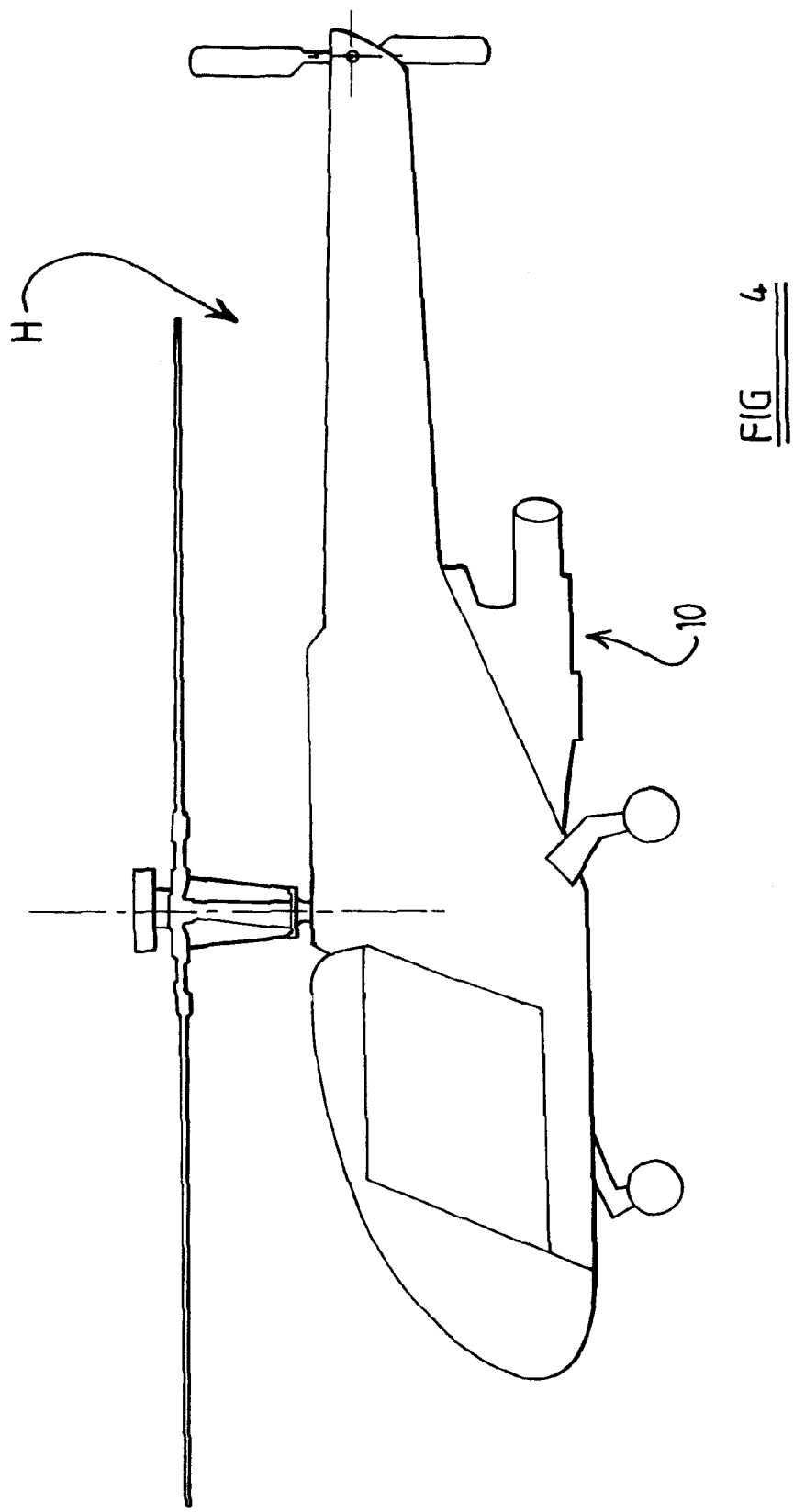
FIG. 4 is a schematic view of a helicopter having an infra red suppressor apparatus in accordance with the invention

FIG. 4 illustrates a helicopter H having the suppressor apparatus 10 of FIGS. 2 or 3.

Various modifications may be made to the examples described without departing from the scope of the invention.

For example the actuators 20 need not be piezo-ceramic actuators but alternative kinds of actuator means may be provided, to apply sonic or supersonic energy.

Although the invention has been described as being applied to a gas turbine engine of a helicopter, the invention may be applied to other aircraft, or even other vehicles, and to other kinds of engine where infra red suppression is desired for any purpose.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. An apparatus for the suppression of infra red emissions from an engine including a suppressor body through which pass exhaust gases from the engine, the suppressor body having an inlet for air which is mixed within the suppressor with the hot exhaust gases to cool the exhaust gases before final exhaustion, and wherein at least one sonic or supersonic energy generator is provided to apply respectively within the suppressor body, sonic or supersonic energy to enhance the efficiency of infra red suppression.

2. An apparatus according to claim 1 wherein the suppressor body at least substantially surrounds an engine exhaust pipe, and provides a duct between the engine exhaust pipe and suppressor body, which duct provides the air inlet means.

3. An apparatus according to claim 1 wherein the sonic or supersonic energy is applied by actuators provided on the engine exhaust pipe within the suppressor body.

4. An apparatus according to claim 1 wherein the sonic or supersonic energy is applied by actuator provided on a surface of the suppressor body.

5. An apparatus according to claim 3 wherein the actuators are a plurality of high frequency response actuators controlled by a control means which applies a signal of a predetermined frequency to the actuators.

6. An apparatus according to claim 5 wherein the actuators are piezo-ceramic actuators.

7. An apparatus according to claim 1 wherein the apparatus is adapted for use with a gas turbine engine.

8. In combination an engine and an apparatus for the suppression of infra red emissions from the engine wherein the apparatus for the suppression of infra red emissions is an apparatus including a suppressor body through which pass exhaust gases from the engine, the suppressor body having an inlet for air which is mixed within the suppressor with the hot exhaust gases to cool the exhaust gases before final exhaustion, and wherein at least one sonic or supersonic energy generator is provided to apply respectively within the suppressor body, sonic or supersonic energy to enhance the efficiency of infra red suppression.

9. A vehicle having an engine and an apparatus for the suppression of infra red emissions from the engine, the suppression apparatus including a suppressor body through which pass exhaust gases from the engine, the suppressor body having an inlet for air which is mixed within the suppressor with the hot exhaust gases to cool the exhaust gases before final exhaustion, and wherein at least one sonic or supersonic energy generator is provided to apply respectively within the suppressor body, sonic or supersonic energy to enhance the efficiency of infra red suppression.

10. A vehicle according to claim 9 which is an aircraft.

11. A method of enhancing the efficiency of the suppression of infra red emissions from an engine including the steps of providing a suppressor body for the passage of exhaust gases from the engine, the suppressor body having an inlet means for air which is mixed within the suppressor body with the hot exhaust gases to cool the exhaust gases before final exhaustion, characterised in that the method includes applying within the suppressor body, sonic or supersonic energy.

* * * * *